United States Patent
Deng et al.

(10) Patent No.: US 11,660,874 B2
(45) Date of Patent: May 30, 2023

(54) PRINTING DEVICES AND LIQUID LEVEL DEPTH DETECTION METHOD

(71) Applicant: SHENZHEN ANYCUBIC TECHNOLOGY CO., LTD., Shenzhen (CN)

(72) Inventors: Xinqiao Deng, Shenzhen (CN); Xin Ouyang, Shenzhen (CN)

(73) Assignee: SHENZHEN ANYCUBIC TECHNOLOGY CO., LTD., Shenzhen (CN)

(*) Notice: Subject to any disclaimer, the term of this patent is extended or adjusted under 35 U.S.C. 154(b) by 65 days.

(21) Appl. No.: 17/453,646

(22) Filed: Nov. 4, 2021

(65) Prior Publication Data
US 2022/0184966 A1    Jun. 16, 2022

(30) Foreign Application Priority Data
Dec. 16, 2020 (CN) .......................... 202011485186.6

(51) Int. Cl.
*B41J 2/175* (2006.01)
*G01F 23/24* (2006.01)

(52) U.S. Cl.
CPC .......... *B41J 2/17566* (2013.01); *G01F 23/24* (2013.01); *B41J 2002/17579* (2013.01)

(58) Field of Classification Search
CPC .................................................... B41J 2/17566
See application file for complete search history.

(56) References Cited

U.S. PATENT DOCUMENTS

| 5,500,657 A | * | 3/1996 | Yauchi ................. B41J 2/04555 347/92 |
| 5,966,983 A | | 10/1999 | Pfeiffer et al. |
| 2016/0151968 A1 | * | 6/2016 | Lin ....................... B29C 64/112 73/317 |

* cited by examiner

*Primary Examiner* — Jason S Uhlenhake
(74) *Attorney, Agent, or Firm* — Bayramoglu Law Offices LLC (57) ABSTRACT

A printing device includes a main control board, a resin vat, a vibration generating assembly, a detection assembly and a support plate. The vibration generating assembly includes a drive component and a paddle. A drive end of the drive component is connected to the paddle, and the drive end is configured to drive the paddle to vibrate. The detection assembly includes an elastic sheet, a resistance strain gage and a detection circuit. The resistance strain gage is attached to the elastic sheet, a first end of the elastic sheet is arranged on the first face of the support plate, and a second end of the elastic sheet extends into the liquid to be detected. The detection circuit is configured to determine an output voltage according to a resistance value of the resistance strain gage. Automatic detection of the liquid level depth of the liquid to be detected is achieving.

10 Claims, 3 Drawing Sheets

PRINTING DEVICES AND LIQUID LEVEL DEPTH DETECTION METHOD

CROSS REFERENCE TO THE RELATED APPLICATIONS

This application is based upon and claims priority to Chinese Patent Application No. 202011485186.6 filed on Dec. 16, 2020, the entire contents of which are incorporated herein by reference.

TECHNICAL FIELD

The present invention belongs to the technical field of printing, and in particular to a printing device and a liquid level depth detection method.

BACKGROUND

Three dimensional (3D) printing technology is a new type of rapid prototyping technology based on digital models, with models being manufactured via printing layer by layer, and is a completely different modeling technology from traditional mold manufacturing. In the existing 3D printing devices, a resin vat is used to contain a liquid resin, and a user needs to observe the depth of the liquid level of the resin in real time during printing so as to ensure that the resin in the resin vat remains within a depth range allowable for printing such that the printing can be performed normally. Therefore, the existing 3D printing devices bring much inconvenience to the user.

SUMMARY

Embodiments of the present disclosures provide a printing device and a liquid level depth detection method, in order to solve the problem in the existing 3D printing devices whereby it is necessary for a user to observe the depth of the liquid level of a resin in real time during printing, bringing much inconvenience to the user.

In order to solve the above technical problem, the present disclosures are achieved as follows:

In a first aspect, an embodiment of the present disclosures provides a printing device. The printing device includes a main control board and a resin vat for containing a liquid to be detected. The printing device further includes: a vibration generating assembly, a detection assembly and a support plate.

The vibration generating assembly includes a drive component and a paddle. A drive end of the drive component is connected to the paddle, and the drive end is configured to drive the paddle to vibrate. A first end of the paddle is arranged on a first face of the support plate, a second end of the paddle extends into the liquid to be detected, and the first end of the paddle and the second end of the paddle are two opposite ends of the paddle. The first face is a face of the support plate that faces the liquid to be detected.

The detection assembly includes an elastic sheet, a resistance strain gage and a detection circuit. The resistance strain gage is attached to the elastic sheet, a first end of the elastic sheet is arranged on the first face of the support plate, and a second end of the elastic sheet extends into the liquid to be detected. The first end of the elastic sheet and the second end of the elastic sheet are two opposite ends of the elastic sheet, and the elastic sheet is configured, according to deformation caused by vibration of the liquid to be detected, to change a resistance value of the resistance strain gage.

A first end of the detection circuit is electrically connected to the resistance strain gage, and a second end of the detection circuit is connected to the main control board. The detection circuit is configured to determine an output voltage according to the resistance value of the resistance strain gage such that the main control board determines the depth of the liquid to be detected according to the output voltage.

Optionally, the resistance strain gage includes a positive strain resistor and a negative strain resistor.

The positive strain resistor and the negative strain resistor are respectively attached to two oppositely disposed faces of the elastic sheet. The changing in resistance values of the positive strain resistor and the negative strain resistor is directly proportional to deformation of the elastic sheet.

Optionally, the detection circuit includes a first resistor, a second resistor, a reference voltage output end, a grounding end and a differential amplifier.

Resistance values of the first resistor and the second resistor are equal.

A first end of the positive strain resistor and a first end of the negative strain resistor are respectively connected to the reference voltage output end. A second end of the positive strain resistor and a first end of the first resistor are respectively connected to a first input end of the differential amplifier. A second end of the first resistor and a first end of the second resistor are respectively connected to the grounding end, and a second end of the second resistor and a second end of the negative strain resistor are respectively connected to a second input end of the differential amplifier.

The first end of the detection circuit includes the reference voltage output end, the first end of the first resistor, the first input end of the differential amplifier, the second end of the second resistor, and the second input end of the differential amplifier.

Optionally, the drive component includes a motor and an eccentric wheel.

The motor and the eccentric wheel are respectively arranged on the support plate, an output end of the motor is connected to the eccentric wheel, and the eccentric wheel is arranged adjacent to the paddle.

Optionally, the paddle is arranged between the elastic sheet and the eccentric wheel, and the eccentric wheel is driven by the motor to rotate to further drive the paddle to vibrate.

Optionally, the printing device further includes a fixing assembly.

The fixing assembly includes a support column, a lock screw and a swing arm. The support column is perpendicularly arranged on a top face of the resin vat. A first end of the swing arm is fixedly connected to the support column via the lock screw, and a second end of the swing arm is connected to the support plate. The first end of the swing arm and the second end of the swing arm are two opposite ends of the swing arm.

In a second aspect, an embodiment of the present disclosures further provides a liquid level depth detection method applied to the printing device as described in the first aspect. The method includes:

Controlling the drive component to drive the vibration of the paddle at a preset rate so as to vibrate the liquid to be detected;

Determining an output voltage of the detection circuit in response to detecting the vibration of the elastic sheet; and Determining the depth of the liquid to be detected according to the output voltage. Optionally, determining an output voltage of the detection circuit in response to detecting the vibration of the elastic sheet includes:

Determining, in response to detecting the vibration of the elastic sheet, a resistance value of the resistance strain gage attached to the elastic sheet according to deformation of the elastic sheet, where the resistance strain gage includes a positive strain resistor and a negative strain resistor; and Determining the output voltage of the detection circuit according to the resistance value. In a third aspect, an embodiment of the present application provides a liquid depth detection apparatus applied to the printing device as described in the first aspect. The apparatus includes:

A control module configured to control a drive component to drive the vibration of the paddle at a preset rate so as to vibrate the liquid to be detected;

A first determination module configured to determine an output voltage of the detection circuit in response to detecting the vibration of the elastic sheet; and A second determination module configured to determine the depth of the liquid to be detected according to the output voltage.

In a fourth aspect, an embodiment of the present application provides a readable storage medium. The readable storage medium stores a program or instructions, the program or instructions implementing, when the program or instructions is executed by at least one processor, the steps of the method as described in the second aspect.

In the embodiments of the present disclosures, the printing device includes: a vibration generating assembly, a detection assembly and a support plate. The vibration generating assembly includes a drive component and a paddle, a drive end of the drive component is connected to the paddle, and the drive end is configured to drive the paddle to vibrate. A first end of the paddle is arranged on a first face of the support plate, a second end of the paddle extends into the liquid to be detected, and the first end of the paddle and the second end of the paddle are two opposite ends of the paddle. The first face is a face of the support plate that faces the liquid to be detected. The detection assembly includes an elastic sheet, a resistance strain gage and a detection circuit. The resistance strain gage is attached to the elastic sheet, a first end of the elastic sheet is arranged on the first face of the support plate, and a second end of the elastic sheet extends into the liquid to be detected. The first end of the elastic sheet and the second end of the elastic sheet are two opposite ends of the elastic sheet, and the elastic sheet is configured, according to deformation caused by vibration of the liquid to be detected, to change a resistance value of the resistance strain gage. A first end of the detection circuit is electrically connected to the resistance strain gage, and a second end of the detection circuit is connected to the main control board. The detection circuit is configured to determine an output voltage according to a resistance value of the resistance strain gage, such that the main control board determines the depth of the liquid to be detected according to the output voltage, thereby achieving automatic detection of the liquid level depth of the liquid to be detected.

BRIEF DESCRIPTION OF THE DRAWINGS

In order to more clearly illustrate the technical solutions in the embodiments of the present disclosures, the drawings used in the description of the embodiments of the present disclosures will be briefly described below. Obviously, the drawings in the following description are only some embodiments of the present disclosures, and a person skilled in the art can obtain other drawings according to the drawings without any creative work.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the embodiments described are some examples, rather than all of the embodiments of the present disclosure. On the basis of the embodiments of the present disclosure, all the other embodiments obtained by those of ordinary skill in the art without creative efforts shall fall within the scope of protection of the present disclosure.

Figure 1:
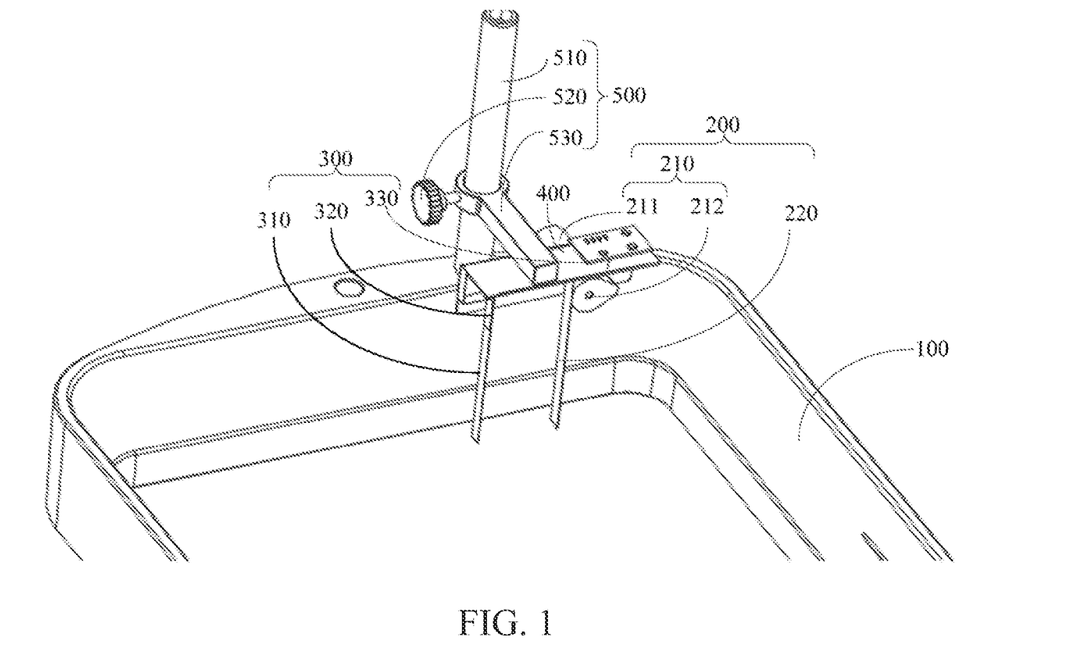
FIG. 1 is a structural schematic diagram of a printing device provided in an embodiment of the present disclosure.

With reference to FIG. 1, FIG. 1 is a structural schematic diagram of a printing device provided in an embodiment of the present disclosure. As shown in FIG. 1, the printing device includes a resin vat 100 and a main control board (not shown in the figures). The resin vat 100 is configured to contain a liquid to be detected. The printing device further includes: a vibration generating assembly 200, a detection assembly 300 and a support plate 400.

The vibration generating assembly 200 includes a drive component 210 and a paddle 220. A drive end of the drive component 210 is connected to the paddle 220, and the drive end is configured to drive the paddle 220 to vibrate. A first end of the paddle 220 is arranged on a first face of the support plate 400, a second end of the paddle 220 extends into the liquid to be detected, and the first end of the paddle 220 and the second end of the paddle 220 are two opposite ends of the paddle 220. The first face is a face of the support plate 400 that faces the liquid to be detected.

The detection assembly 300 includes an elastic sheet 310, a resistance strain gage 320 and a detection circuit 330. The resistance strain gage 320 is attached to the elastic sheet 310, a first end of the elastic sheet 310 is arranged on the first face of the support plate 400, and a second end of the elastic sheet 310 extends into the liquid to be detected. The first end of the elastic sheet 310 and the second end of the elastic sheet 310 are two opposite ends of the elastic sheet 310, and the elastic sheet 310 is configured, according to deformation caused by vibration of the liquid to be detected, to change a resistance value of the resistance strain gage 320.

A first end of the detection circuit 330 is electrically connected to the resistance strain gage 320, and a second end of the detection circuit 330 is connected to the main control board. The detection circuit 330 is configured to determine an output voltage according to the resistance value of the resistance strain gage 320 such that the main control board determines the depth of the liquid to be detected according to the output voltage.

It should be noted that the support plate 400 can have a regular or irregular shape, such as a square shape, a rectangular shape, or an inverted U shape. The support plate 400 can be parallel to a horizontal plane of the liquid to be detected, or can be arranged at a certain included angle to the horizontal plane of the liquid to be detected. The drive component 210 of the vibration generating assembly 200 and the detection circuit 330 of the detection assembly 300 can be arranged on either face of the support plate 400, which is not specifically limited in this application.

With regard to the arrangement of the support plate 400, the support plate can be directly connected to the printing device. For example, the support plate 400 is directly fixedly arranged on a top face of the resin vat 100 such that the second end of the paddle 220 and the second end of the elastic sheet 310 extend into the liquid to be detected. It is also possible that the support plate is connected to the printing device via other assemblies. For example, the support plate is connected to the resin vat 100 via a connecting assembly or a fixing assembly to fixedly arrange the support plate 400 above the resin vat 100. It is also possible to arrange the support plate 400 above the resin vat 100 via a separately arranged assembly, the support plate 400 having no direct relationship or indirect connection relationship with the printing device.

Specifically, the vibration generating assembly 200 includes the drive component 210 and the paddle 220, and the drive component 210 can drive the paddle 220 to vibrate. Since the second end of the paddle 220 extends into the liquid to be detected, the vibrating paddle 220 can vibrate the liquid to be detected, generating a vibration wave. When the drive component 210 drives the paddle 220 to vibrate at a fixed frequency, there is a linear relationship between the intensity of the vibration wave at a vibration position of the paddle 220 and the depth of the liquid to be detected, for example:

$$W_{t1} = c_1 * L_t \tag{1}$$

Wherein, the $W_{t1}$ represents the intensity of the vibration wave, the $c_1$ represents a proportionality constant and $L_t$ represents the depth of the liquid to be detected.

The detection assembly 300 includes the elastic sheet 310, the resistance strain gage 320, and the detection circuit 330. Since the second end of the elastic sheet 310 is arranged in the liquid to be detected, when the vibration wave in the liquid to be detected drives the elastic sheet 310 to deform, the resistance strain gage 320 attached to the elastic sheet 310 will change its resistance value according to deformation of the elastic sheet 310. Specifically, there is a linear relationship between the intensity of the vibration wave at the vibration position of the paddle 220 and the amplitude of the vibration wave received by the elastic sheet 310, for example:

$$W_{t2} = c_2 * W_{t1} \tag{2}$$

Wherein, the $W_{t2}$ represents the intensity of the vibration wave, the $c_2$ represents an attenuation coefficient of vibration wave transmission and the $W_{t1}$ represents the intensity of the vibration wave at the vibration position of the paddle 220. Moreover, the amplitude of the vibration wave received by the elastic sheet 310 is related to deformation of the elastic sheet 310. The greater the amplitude of the vibration wave, the greater the deformation of the elastic sheet 310, and thus the greater the change in the resistance value of the resistance strain gage 320.

By electrically connecting the first end of the detection circuit 330 to the resistance strain gage 320, the detection circuit 330 can detect the changing in the resistance value of the resistance strain gage 320, and control the voltage value of an output end according to the change in the resistance value of the resistance strain gage 320. Therefore, the magnitude of the voltage value output by the detection circuit 330 can reflect deformation of the elastic sheet 310, and then determine the amplitude of the vibration wave and the depth of the liquid to be detected.

Since the second end of the detection circuit 330, namely, the output end of a differential amplifier A1, is connected to the main control board of the printing device, the main control board can obtain the output voltage of the second end of the detection circuit 330 in real time, determine the depth of the liquid to be detected according to the output voltage, and when determining that the depth of the liquid to be detected is lower than a preset threshold value, control the printing device to stop printing, or send an alarm to prompt a user to add the liquid to be detected in a timely manner. In this way, the printing device can automatically detect the depth of the liquid to be detected, such as resin, the user does not need to observe the change amount of the resin in real time during the printing process of the printing device, and accordingly the intelligence of the printing device and the use experience of the user are improved.

Further, the resistance strain gage 320 includes a positive strain resistor R1 and a negative strain resistor R2.

The positive strain resistor R1 and the negative strain resistor R2 are respectively attached to two oppositely disposed faces of the elastic sheet 310. The changing in resistance values of the positive strain resistor R1 and the negative strain resistor R2 is directly proportional to deformation of the elastic sheet 310.

Specifically, the resistance strain gage 320 can be any one of a wire strain gage, a foil strain gage, a thin film strain gage, a semiconductor strain gage, etc. The resistance strain gage 320 includes a positive strain resistor R1 and a negative strain resistor R2.

The positive strain resistor R1 and the negative strain resistor R2 can be attached to two oppositely disposed faces of the elastic sheet 310. The resistance value of the positive strain resistor R1 becomes greater when the elastic sheet 310 deforms positively; and the resistance value of the negative strain resistor R2 becomes smaller when the elastic sheet 310 deforms positively. The positive deformation here refers to a deformation direction in which the positive strain resistor R1 is stretched or the negative strain resistor R2 is compressed. The resistance value of the positive strain resistor R1 becomes smaller when the elastic sheet 310 deforms negatively; and the resistance value of the negative strain resistor R2 becomes greater when the elastic sheet 310 deforms negatively. The negative deformation here refers to a deformation direction in which the positive strain resistor R1 is compressed or the negative strain resistor R2 is stretched. Since when vibrating, the elastic sheet 310 is switched back and forth between two states, namely the positive deformation and the negative deformation, there is an increase in the resistance value of one resistor and a decrease in the resistance value of the other resistor regardless of whether the elastic sheet is in the positive deformation or the negative deformation. Therefore, deformation of the elastic sheet 310 can be obtained by arranging the positive strain resistor R1 and the negative strain resistor R2 on the two oppositely disposed faces of the elastic sheet 310, and accordingly the accuracy of detecting deformation of the elastic sheet 310 is improved.

Figure 2:
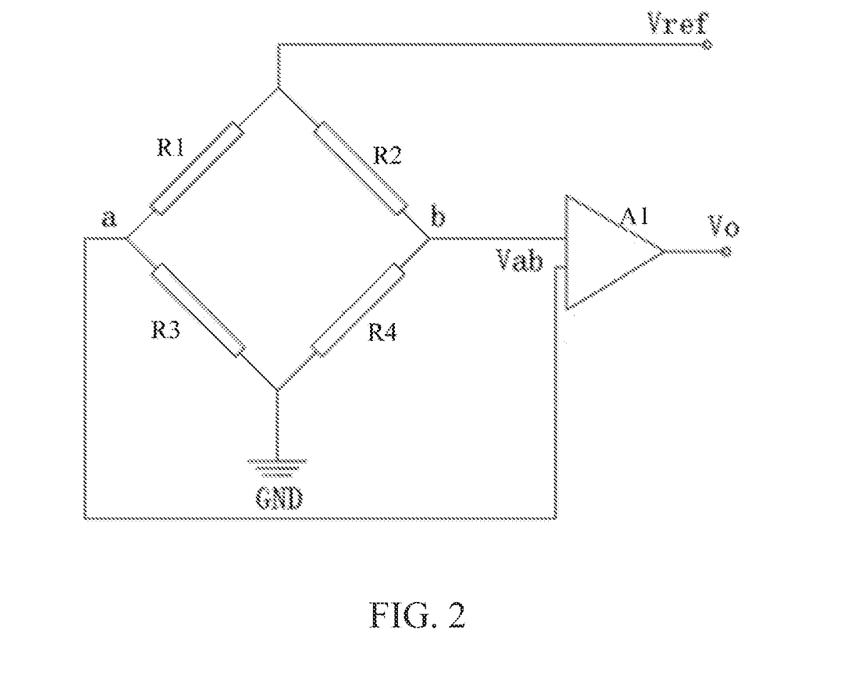
FIG. 2 is a circuit structure diagram after a resistance strain gage is combined with a detection circuit provided in the embodiment of the present application.

Further, the detection circuit 330 includes a first resistor R3, a second resistor R4, a reference voltage output end, a grounding end and a differential amplifier A1.

Resistance values of the first resistor R3 and the second resistor R4 are equal.

A first end of the positive strain resistor R1 and a first end of the negative strain resistor R2 are respectively connected to the reference voltage output end. A second end of the positive strain resistor R1 and a first end of the first resistor R3 are respectively connected to a first input end of the differential amplifier A1. A second end of the first resistor R3 and a first end of the second resistor R4 are respectively connected to the grounding end, and a second end of the second resistor R4 and a second end of the negative strain resistor R2 are respectively connected to a second input end of the differential amplifier A1.

The first end of the detection circuit 330 includes the reference voltage output end, the first end of the first resistor R3, the first input end of the differential amplifier A1, the second end of the second resistor R4, and the second input end of the differential amplifier A1.

Specifically, with reference to FIG. 2, FIG. 2 is a circuit structure diagram after the resistance strain gage is combined with the detection circuit provided in the embodiment of the present application. As shown in FIG. 2, the resistance strain gage 320 is connected to the first end of the detection circuit 330. The first end of the detection circuit 330 includes five sub-ends, the five sub-ends are specifically the reference voltage output end, the first end of the first resistor R3, the first input end of the differential amplifier A1, the second end of the second resistor R4, and the second input end of the differential amplifier A1. In this way, after the resistance strain gage 320 is connected to the first end of the detection circuit 330, a circuit structure can be formed as shown in FIG. 2. Specifically, the first end of the first resistor R3 is connected to the second end of the positive strain resistor R1, the second end of the first resistor R3 is connected to the first end of the second resistor R4, the second end of the second resistor R4 is connected to the second end of the negative strain resistor R2, the first end of the negative strain resistor R2 is connected to the first end of the positive strain resistor R1, the second end of the first resistor R3 and the first end of the second resistor R4 are both connected to the grounding end, and the first end of the negative strain resistor R2 and the first end of the positive strain resistor R1 are both connected to the reference voltage output end, thereby forming a bridge circuit. A voltage value between two connection points a and b of the bridge circuit can vary according to the change in the resistance values of the negative strain resistor R2 and the positive strain resistor R1. The connection point a is then connected to the first input end of the differential amplifier A1, the connection point b is connected to the second input end of the differential amplifier A1, the voltage value between the two connection points a and b is amplified via the differential amplifier A1, and the amplified voltage value between the two connection points a and b is output from the output end of the differential amplifier A1.

It should be noted that the reference voltage output end is configured to output a reference voltage with a constant voltage value to supply power to the bridge circuit. The first resistor R3 and the second resistor R4 are both resistors with constant resistance values, and the resistance values of the first resistor R3 and the second resistor R4 are the same.

When the elastic sheet 310 deforms positively, the resistance value of the positive strain resistor R1 becomes greater, and the resistance value of the negative strain resistor R2 becomes smaller. When the elastic sheet 310 deforms negatively, the resistance value of the positive strain resistor R1 becomes smaller, and the resistance value of the negative strain resistor R2 becomes greater. Therefore, the voltage value between the two connection points a and b can be measured as:

$$V_{ab} = V_a - V_b = V_{ref}\left(\frac{R_a}{R_a + R_c} - \frac{R_b}{R_b + R_c}\right) \quad (3)$$

With reference to the circuit structure diagram shown in FIG. 2, wherein $V_{ref}$ represents the reference voltage output by the reference voltage output end, $R_a$ represents the resistance value of the positive strain resistor R1, $R_b$ represents the resistance value of the negative strain resistor R2, and $R_c$ represents the resistance values of the first resistor R3 and the second resistor R4. Assuming that an amplification factor of the differential amplifier A1 is represented by $A_p$, the output voltage output by the output end of the differential amplifier A1, i.e., the second end of the detection circuit 330, is:

$$V_o = A_p * V_{ab} \quad (4)$$

Moreover, the voltage value of $V_o$ also has a linear relationship with the amplitude of the vibration wave received by the elastic sheet 310, the linear relationship is specifically $V_o = c_3 * W_{t2}$, wherein $W_{t2}$ represents the amplitude of the vibration wave received by the elastic sheet 310, and $c_3$ represents a constant. It can be seen therefrom that the greater the deformation of the elastic sheet 310, the greater the voltage value of $V_o$. Therefore, the main control board can determine deformation of the elastic sheet 310 according to the voltage value of $V_o$, then determine the depth of the liquid to be detected, such as resin, and control a working state of the printing device, avoiding printing failure due to continued printing when the resin is running short.

Further, the drive component 210 includes a motor 211 and an eccentric wheel 212.

The motor 211 and the eccentric wheel 212 are respectively arranged on the support plate 400, an output end of the motor 211 is connected to the eccentric wheel 212, and the eccentric wheel 212 is arranged adjacent to the paddle 220.

Specifically, the motor 211 can be a direct current motor 211 or an alternating current motor 211. The output end of the motor 211 is connected to the eccentric wheel 212 for driving the eccentric wheel 212 to rotate. The eccentric wheel 212 is arranged adjacent to the paddle 220, and the eccentric wheel and the paddle are both arranged on the first face of the support plate 400. During the rotation of the eccentric wheel 212, the eccentric wheel 212 can collide with the paddle 220 arranged adjacent thereto such that the paddle 220 vibrates under the collision of the eccentric wheel 212 and then vibrates the liquid to be detected.

Figure 3:
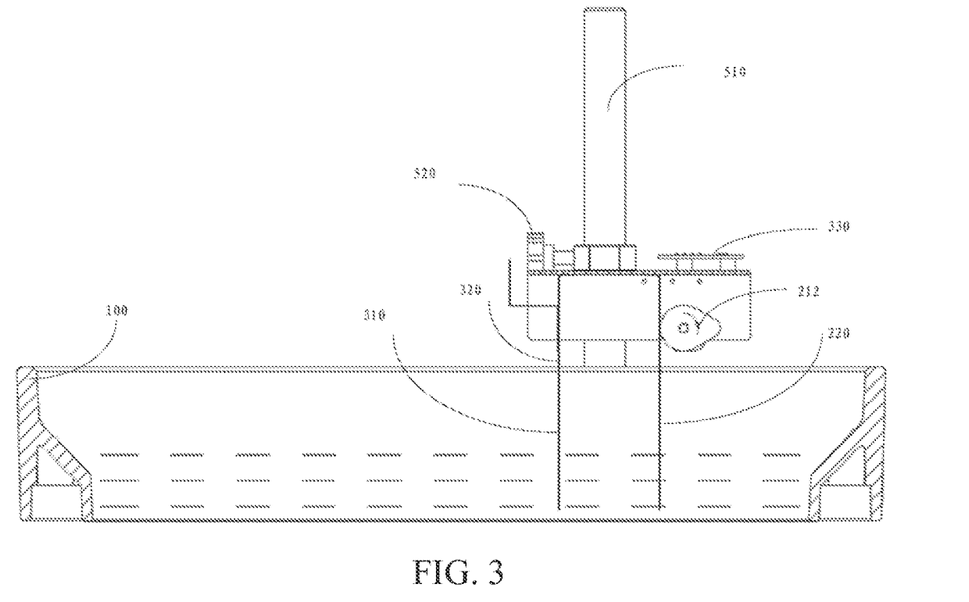
FIG. 3 is a structural schematic diagram of the printing device provided in an embodiment of the present application.

Further, with reference to FIG. 3, FIG. 3 is a structural schematic diagram of the printing device provided in the embodiment of the present application. As shown in FIG. 3, the paddle 220 is arranged between the elastic sheet 310 and the eccentric wheel 212, and the eccentric wheel 212 is driven by the motor 211 to rotate to further drive the paddle 220 to vibrate.

In an embodiment, the paddle 220 can be arranged between the elastic sheet 310 and the eccentric wheel 212 such that the eccentric wheel 212 is relatively far away from the elastic sheet 310, the eccentric wheel 212 is prevented from interfering with the elastic sheet 310, and accordingly the accuracy of detecting deformation of the elastic sheet 310 is improved. In an embodiment, since during the rotation, the rotation speed of the motor 211 determines the rotation speed of the eccentric wheel 212, when the rotation speed of the eccentric wheel 212 is higher than a numerical value, the intensity of the vibration wave at the vibration position of the paddle 220 is too large to result in splashing of the liquid to be detected; when the rotation speed of the eccentric wheel 212 is lower than a numerical value, the intensity of the vibration wave at the vibration position of the paddle 220 is too small to result in the amplitude of the vibration wave received by the elastic sheet 310 being too small or having been attenuated, so that deformation of the elastic sheet 310 is not obvious, affecting the detection effect. Thus, the rotation speed of the motor 211 can be controlled, to maintain the rotation speed in the range of 60 to 300 rpm, thereby ensuring the detection effect. Further, with continuing reference to FIG. 1, the printing device further includes a fixing assembly 500.

The fixing assembly 500 includes a support column 510, a lock screw 520 and a swing arm 530. The support column 510 is perpendicularly arranged on the top face of the resin vat 100, a first end of the swing arm 530 is fixedly connected to the support column 510 via the lock screw 520, a second end of the swing arm 530 is connected to the support plate 400, and the first end of the swing arm 530 and the second end of the swing arm 530 are two opposite ends of the swing arm 530.

Specifically, the support column 510 can be fixed to the resin vat 100 via bolts, snaps, adhesives, etc., or can be integrally formed with the resin vat 100. The support column 510 can be a columnar structure with a cross section in any shape, such as a circle, a rectangle, a square, a triangle, etc., and the first end of the swing arm 530 is adapted to the shape of the cross section of the support column 510. The support column 510 is arranged on the top face of the resin vat 100, and the swing arm 530 is then arranged on the support column 510 via the lock screw 520, so that the height of the support plate 400 can be adjusted by adjusting the height of the swing arm 530 on the support column 510.

In an embodiment, the support column 510 can be in the shape of a cylinder, the first end of the swing arm 530 can be in the shape of a circular ring, and the radius of the circular ring is slightly greater than that of the cylinder. A threaded hole is formed in a side wall of the circular ring, and the lock screw 520 can pass through the threaded hole to fix the circular ring. In this way, the swing arm 530 can rotate around the cylinder at a height position thereof by adjusting the lock screw 520, bringing convenience to the user in adjusting the positions of the paddle 220 and the elastic sheet 310 in the liquid to be detected.

Figure 4:
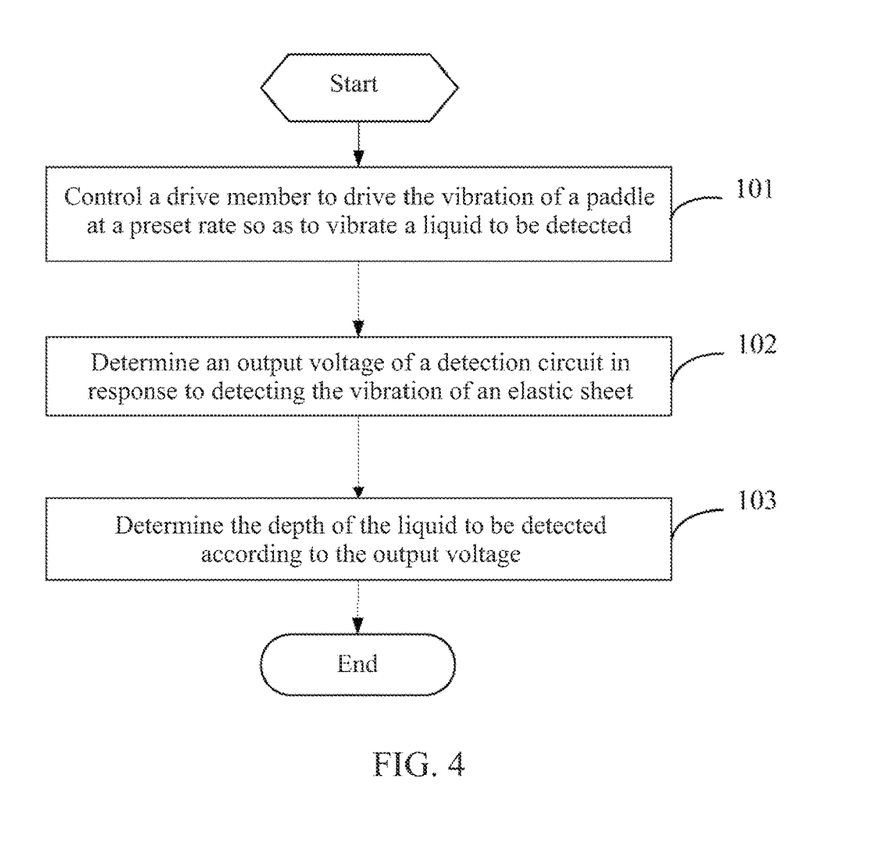
FIG. 4 is a flow chart of a liquid level depth detection method provided in an embodiment of the present application.

In addition, an embodiment of the present application also provides a liquid level depth detection method. With reference to FIG. 4, FIG. 4 is a flow chart of the liquid level depth detection method provided in the embodiment of the present application. As shown in FIG. 4, the liquid level depth detection method is applied to the printing device as described above, and the method includes the following steps. The liquid level depth usually refers to a liquid depth, in the embodiments of the present disclosure.

At step 101, the drive component 210 is controlled to drive the vibration of the paddle 220 at a preset rate so as to vibrate the liquid to be detected.

The liquid to be detected can be any kind of liquid, such as water and liquid resin. Since the method is applied to the printing device, the liquid resin can be selected as the liquid to be detected. The preset rate herein can be specifically set according to the actual situation. In an optional embodiment, the preset rate of the drive component can be set to 60 to 300 revolutions per minute.

Since the drive end of the drive component 210 is connected to the paddle 220, when the drive component 210 drives the paddle 220 to vibrate at a fixed frequency, there is a linear relationship between the intensity of the vibration wave at the vibration position of the paddle 220 and the depth of the liquid to be detected, for example:

$$W_{t1}=c_1 * L_t \tag{5}$$

Wherein the $W_{t1}$ represents the intensity of the vibration wave, the $c_1$ represents a proportionality constant and $L_t$ represents the depth of the liquid to be detected.

At step 102, an output voltage of the detection circuit 330 is determined in response to detecting the vibration of the paddle 220.

Since the second end of the elastic sheet 310 is arranged in the liquid to be detected, when the vibration wave in the liquid to be detected drives the elastic sheet 310 to deform, the resistance strain gage 320 attached to the elastic sheet 310 will change its resistance value according to the deformation of the elastic sheet 310. Specifically, there is a linear relationship between the intensity of the vibration wave at the vibration position of the paddle 220 and the amplitude of the vibration wave received by the elastic sheet 310, for example, $W_{t2}=c_2 * W_{t1}$, where $c_2$ represents an attenuation coefficient of vibration wave transmission and $W_{t1}$ represents the intensity of the vibration wave at the vibration position of the paddle 220. Since the amplitude of the vibration wave received by the elastic sheet 310 is related to the deformation of the elastic sheet 310, the resistance strain gage 320 attached to the elastic sheet 310 can be detected by the detection circuit 330 so as to obtain the output voltage of the detection circuit 330. Specifically, the voltage value between two connection points a and b can be measured as:

$$V_{ab} = V_a - V_b = V_{ref}\left(\frac{R_a}{R_a + R_c} - \frac{R_b}{R_b + R_c}\right) \tag{6}$$

With reference to the circuit structure diagram shown in FIG. 2, wherein $V_{ref}$ represents the reference voltage output by the reference voltage output end, $R_a$ represents the resistance value of the positive strain resistor R1, $R_b$ represents the resistance value of the negative strain resistor R2, and $R_c$ represents the resistance values of the first resistor R3 and the second resistor R4. Assuming that an amplification factor of the differential amplifier A1 is represented by $A_p$, the output voltage output by the output end of the differential amplifier A1, i.e., the second end of the detection circuit 330, is:

$$V_o = A_p * V_{ab} \tag{7}$$

Moreover, the voltage value of $V_o$ also has a linear relationship with the amplitude of the vibration wave received by the elastic sheet 310, the linear relationship is specifically $$V_o = c_3 * W_{t2} \tag{8}$$

Wherein, $W_{t2}$ represents the amplitude of the vibration wave received by the elastic sheet 310, and $c_3$ represents a constant. It can be seen therefrom that the deeper the depth of the liquid to be detected, the greater the intensity of the vibration wave at the vibration position of the paddle 220, the greater the amplitude of the vibration wave received by the elastic sheet 310, and thus the greater the voltage value of $V_o$. At step 103, the depth of the liquid to be detected is determined according to the output voltage.

Since the second end of the detection circuit 330 is connected to the main control board of the printing device, the main control board can obtain the output voltage of the second end of the detection circuit 330 in real time. In this way, the magnitude of the amplitude of the vibration wave received by the elastic sheet 310 can be determined according to the magnitude of the output voltage, the intensity of the vibration wave at the vibration position of the paddle 220 can be then determined according to the magnitude of the amplitude of the vibration wave received by the elastic sheet 310, and the depth of the liquid to be detected can be then determined according to the intensity of the vibration wave at the vibration position of the paddle 220. Therefore, the main control board can determine the depth of the liquid to be detected, such as the resin, according to the voltage value of $V_o$, and control the working state of the printing device, avoiding printing failure due to continued printing when the resin is running short.

In this embodiment, when the main control board determines that the depth of the liquid to be detected is lower than a preset threshold value, the main control board can control the printing device to stop printing or give an alarm so as to prompt the user to add the liquid to be detected in a timely manner. In this way, the printing device can automatically detect the depth of the liquid to be detected, such as resin, the user does not need to observe the change amount of the resin in real time during the printing process of the printing device, and accordingly the intelligence of the printing device and the use experience of the user are improved.

Further, in step 102, determining an output voltage of the detection circuit 330 in response to detecting the vibration of the paddle 220 includes the following steps.

In response to detecting the vibration of the elastic sheet 310, the resistance value of the resistance strain gage 320 attached to the elastic sheet 310 is determined according to the deformation of the elastic sheet 310. The resistance strain gage 320 includes a positive strain resistor R1 and a negative strain resistor R2.

The output voltage of the detection circuit 330 is determined according to the resistance value. Specifically, the resistance strain gage 320 includes the positive strain resistor R1 and the negative strain resistor R2, where a resistance value of the positive strain resistor R1 and a resistance value of the negative strain resistor R2 are directly proportional to the deformation of the elastic sheet 310. Thus, when the vibration of the liquid to be detected drives the elastic sheet 310 to vibrate, the resistance values of the positive strain resistor R1 and the negative strain resistor R2 are determined according to the deformation of the elastic sheet 310. Assuming that the resistance value of the positive strain resistor R1 is $R_a$ and the resistance value of the negative strain resistor R2 is $R_b$.

In an embodiment, the positive strain resistor R1 and the negative strain resistor R2 are respectively connected to the first end of the detection circuit 330 to form the circuit structure as shown in FIG. 2. Specifically, the first end of the first resistor R3 is connected to the second end of the positive strain resistor R1, the second end of the first resistor R3 is connected to the first end of the second resistor R4, the second end of the second resistor R4 is connected to the second end of the negative strain resistor R2, the first end of the negative strain resistor R2 is connected to the first end of the positive strain resistor R1, the second end of the first resistor R3 and the first end of the second resistor R4 are both connected to the grounding end, and the first end of the negative strain resistor R2 and the first end of the positive strain resistor R1 are both connected to the reference voltage output end, thereby forming a bridge circuit. A voltage value between two connection points a and b of the bridge circuit can vary according to the change in the resistance values of the negative strain resistor R2 and the positive strain resistor R1. The connection point a is then connected to the first input end of the differential amplifier A1, the connection point b is connected to the second input end of the differential amplifier A1, the voltage value between the two connection points a and b is amplified via the differential amplifier A1, and the amplified voltage value between the two connection points a and b is output from the output end of the differential amplifier A1.

When the elastic sheet 310 deforms positively, the resistance value of the positive strain resistor R1 becomes greater, and the resistance value of the negative strain resistor R2 becomes smaller. When the elastic sheet 310 deforms negatively, the resistance value of the positive strain resistor R1 becomes smaller, and the resistance value of the negative strain resistor R2 becomes greater. Therefore, the voltage value between the two connection points a and b can be measured as $$V_{ab} = V_a - V_b = V_{ref}\left(\frac{R_a}{R_a + R_c} - \frac{R_b}{R_b + R_c}\right)$$

with reference to the circuit structure diagram shown in FIG. 2, where $V_{ref}$ represents the reference voltage output by the reference voltage output end, $R_a$ represents the resistance value of the positive strain resistor R1, $R_b$ represents the resistance value of the negative strain resistor R2, and $R_c$ represents the resistance values of the first resistor R3 and the second resistor R4. Assuming that an amplification factor of the differential amplifier A1 is represented by $A_p$, the output voltage output by the output end of the differential amplifier A1, i.e., the second end of the detection circuit 330, is $V_o = A_p * V_{ab}$. It can be seen therefrom that the greater the deformation of the elastic sheet 310, the greater the voltage value of $V_o$. Therefore, the main control board can determine the depth of the liquid to be detected, such as the resin, according to the voltage value of $V_o$. The greater the absolute value of the voltage value of $V_o$, the deeper the depth of the resin. When the voltage value of $V_o$ is 0, it means that the height of the resin is lower than the second end of the paddle or the height of the resin is lower than the second end of the elastic sheet, and the depth of the resin is lower than a preset threshold value. At this time, the working state of the printing device can be controlled by the main control board to avoid printing failure due to continued printing when the resin is running short.

In this embodiment, a bridge circuit is formed by connecting the positive strain resistor R1 and the negative strain resistor R2 to the detection circuit 330, and detection of the depth of the liquid to be detected is achieved by converting strain deformations of the positive strain resistor R1 and the negative strain resistor R2 into an output voltage, and the accuracy of the detection result can be improved in this way.

Figure 5:
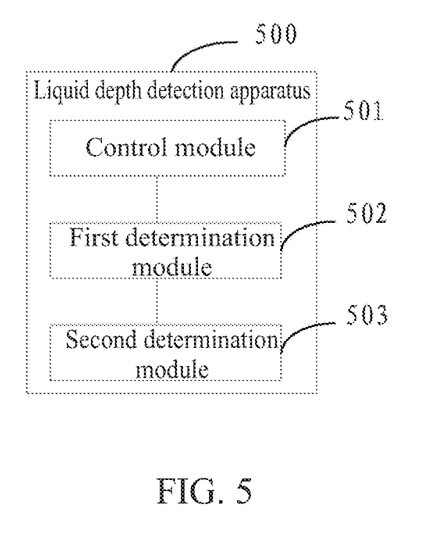
FIG. 5 is a structural schematic diagram of a liquid depth detection apparatus provided in an embodiment of the present application.

With reference to FIG. 5, FIG. 5 is a structural schematic diagram of a liquid depth detection apparatus provided in an embodiment of the present application. As shown in FIG. 5, the liquid depth detection apparatus 500 is applied to the printing device as described above, and the liquid depth detection apparatus 500 includes:

A control module 501 configured to control a drive component to drive the vibration of the paddle at a preset rate so as to vibrate the liquid to be detected;

A first determination module 502 configured to determine an output voltage of the detection circuit in response to detecting the vibration of the elastic sheet; and A second determination module 503 configured to determine the depth of the liquid to be detected according to the output voltage.

Further, the first determination module 502 includes:

A first determination unit configured to determine, in response to detecting the vibration of the elastic sheet, a resistance value of the resistance strain gage attached to the elastic sheet according to the deformation of the elastic sheet, where the resistance strain gage includes a positive strain resistor and a negative strain resistor; and A second determination unit configured to determine the output voltage of the detection circuit according to the resistance value.

The liquid depth detection apparatus 500 in the embodiment of the present application can be a component, an integrated circuit, or a chip in the printing device.

The liquid depth detection apparatus 500 provided in the embodiment of the present application can implement each process of the embodiments of the liquid level depth detection method as described above and achieve the same technical effect, which are not described therein to avoid repetition.

In addition, an embodiment of the present application further provides a readable storage medium. The readable storage medium stores a program or instructions, the program or instructions implementing, when the program or instructions is executed by at least one processor, each process of the embodiments of the liquid level depth detection method as described above and can achieve the same technical effect, which are not described therein to avoid repetition. It should be noted that the term "comprise", "include", or any other variant thereof herein is intended to encompass a non-exclusive inclusion, such that a process, method, article, or apparatus that includes a series of elements not only comprises those elements, but also comprises other elements not explicitly listed, or elements that are inherent to such a process, method, article, or apparatus. In the absence of more restrictions, the element defined by the phrase "comprising a/an . . . " does not exclude the presence of a further identical element in the process, method, article or apparatus that includes the element.

Through the description of the foregoing embodiments, those skilled in the art can clearly understand that the method of the foregoing embodiments can be implemented via software combined with a necessary universal hardware platform, and certainly, can also be implemented through hardware, but in many cases, the former is a better implementation. Based on such an understanding, the technical solution of the disclosure substantively, or the part thereof making a contribution to the prior art can be embodied in the form of a software product. The computer software product is stored in a storage medium (such as an ROM/RAM, a magnetic disk or an optical disc), including a number of instructions for causing a terminal (which can be a mobile phone, a computer, a server, an air conditioner, a network device, etc.) to perform the methods described in the various embodiments of the disclosure.

The embodiments of the disclosure are described above with reference to the accompanying drawings, but the disclosure is not limited to the specific embodiments described above, which are merely illustrative and not restrictive. Those skilled in the art can also make many forms in light of the disclosure without departing from the spirit of the disclosure and the scope of protection of the claims, and these forms all fall into the scope of protection of the disclosure.

What is claimed is:

1. A printing device, comprising a main control board, a resin vat, a vibration generating assembly, a detection assembly and a support plate, wherein the resin vat is configured for containing a liquid to be detected;

wherein the vibration generating assembly comprises a drive component and a paddle, wherein a drive end of the drive component is connected to the paddle, and the drive end is configured to drive the paddle to vibrate; and a first end of the paddle is arranged on a first face of the support plate, and a second end of the paddle extends into the liquid to be detected, wherein the first end of the paddle and the second end of the paddle are two opposite ends of the paddle, and the first face of the support plate faces to the liquid to be detected;

wherein the detection assembly comprises an elastic sheet, a resistance strain gage and a detection circuit, wherein the resistance strain gage is attached to the elastic sheet;

a first end of the elastic sheet is arranged on the first face of the support plate, and a second end of the elastic sheet extends into the liquid to be detected, wherein the first end of the elastic sheet and the second end of the elastic sheet are two opposite ends of the elastic sheet; and the elastic sheet is configured to change a resistance value of the resistance strain gage according to a deformation of the elastic sheet caused by vibration of the liquid to be detected;

wherein a first end of the detection circuit is electrically connected to the resistance strain gage, a second end of the detection circuit is connected to the main control board; the detection circuit is configured to determine an output voltage according to the resistance value of the resistance strain gage, wherein the main control board determines a depth of the liquid to be detected according to the output voltage.

2. The printing device according to claim 1, wherein the resistance strain gage comprises a positive strain resistor and a negative strain resistor;

the positive strain resistor and the negative strain resistor are respectively attached to two oppositely disposed faces of the elastic sheet; and changing in resistance values of the positive strain resistor and the negative strain resistor is directly proportional to the deformation of the elastic sheet.

3. The printing device according to claim 2, wherein the detection circuit comprises a first resistor, a second resistor, a reference voltage output end, a grounding end and a differential amplifier; wherein resistance values of the first resistor and the second resistor are equal;

a first end of the positive strain resistor and a first end of the negative strain resistor are respectively connected to the reference voltage output end;

a second end of the positive strain resistor and a first end of the first resistor are respectively connected to a first input end of the differential amplifier;

a second end of the first resistor and a first end of the second resistor are respectively connected to the grounding end; and a second end of the second resistor and a second end of the negative strain resistor are respectively connected to a second input end of the differential amplifier;

wherein the first end of the detection circuit comprises the reference voltage output end, the first end of the first resistor, the first input end of the differential amplifier, the second end of the second resistor, and the second input end of the differential amplifier.

4. The printing device according to claim 1, wherein the drive component comprises a motor and an eccentric wheel, wherein the motor and the eccentric wheel are respectively arranged on the support plate, an output end of the motor is connected to the eccentric wheel, and the eccentric wheel is arranged adjacent to the paddle.

5. The printing device according to claim 4, wherein the paddle is arranged between the elastic sheet and the eccentric wheel, and the eccentric wheel is driven by the motor to rotate to further drive the paddle to vibrate.

6. The printing device according to claim 1, further comprising a fixing assembly, wherein the fixing assembly comprises a support column, a lock screw and a swing arm, wherein the support column is perpendicularly arranged on a top face of the resin vat; a first end of the swing arm is fixedly connected to the support column via the lock screw, and a second end of the swing arm is connected to the support plate, wherein the first end of the swing arm and the second end of the swing arm are two opposite ends of the swing arm.

7. A liquid level depth detection method, wherein the liquid level depth detection method is applied to a printing device;

wherein the printing device comprises a main control board, a resin vat, a vibration generating assembly, a detection assembly and a support plate, wherein the resin vat is configured for containing a liquid to be detected;

wherein the vibration generating assembly comprises a drive component and a paddle, wherein
a drive end of the drive component is connected to the paddle, and the drive end is configured to drive the paddle to vibrate; and
a first end of the paddle is arranged on a first face of the support plate, and a second end of the paddle extends into the liquid to be detected, wherein the first end of the paddle and the second end of the paddle are two opposite ends of the paddle, and the first face of the support plate faces to the liquid to be detected;

wherein the detection assembly comprises an elastic sheet, a resistance strain gage and a detection circuit, wherein
the resistance strain gage is attached to the elastic sheet;
a first end of the elastic sheet is arranged on the first face of the support plate, and a second end of the elastic sheet extends into the liquid to be detected, wherein the first end of the elastic sheet and the second end of the elastic sheet are two opposite ends of the elastic sheet; and
the elastic sheet is configured to change a resistance value of the resistance strain gage according to a deformation of the elastic sheet caused by vibration of the liquid to be detected;

wherein a first end of the detection circuit is electrically connected to the resistance strain gage, a second end of the detection circuit is connected to the main control board; the detection circuit is configured to determine an output voltage according to the resistance value of the resistance strain gage, wherein the main control board determines a depth of the liquid to be detected according to the output voltage;

wherein the liquid level depth detection method comprises:

controlling the drive component to drive a vibration of the paddle at a preset rate to vibrate the liquid to be detected;

determining the output voltage of the detection circuit in response to detecting a vibration of the elastic sheet; and determining the depth of the liquid to be detected according to the output voltage.

8. The liquid level depth detection method according to claim 7, wherein the step of determining the output voltage of the detection circuit in response to detecting the vibration of the elastic sheet comprises:

determining the resistance value of the resistance strain gage attached to the elastic sheet according to the deformation of the elastic sheet when the vibration of the elastic sheet is detected, wherein the resistance strain gage comprises a positive strain resistor and a negative strain resistor; and determining the output voltage of the detection circuit according to the resistance value.

9. A readable storage medium, wherein the readable storage medium stores a program or instructions, and steps of a liquid level depth detection method in the program or the instructions are executed by at least one processor in a printing device;

wherein the printing device comprises a main control board, a resin vat, a vibration generating assembly, a detection assembly and a support plate, wherein the resin vat is configured for containing a liquid to be detected;

wherein the vibration generating assembly comprises a drive component and a paddle, wherein
a drive end of the drive component is connected to the paddle, and the drive end is configured to drive the paddle to vibrate; and
a first end of the paddle is arranged on a first face of the support plate, and a second end of the paddle extends into the liquid to be detected, wherein the first end of the paddle and the second end of the paddle are two opposite ends of the paddle, and the first face of the support plate faces to the liquid to be detected;

wherein the detection assembly comprises an elastic sheet, a resistance strain gage and a detection circuit, wherein
the resistance strain gage is attached to the elastic sheet;
a first end of the elastic sheet is arranged on the first face of the support plate, and a second end of the elastic sheet extends into the liquid to be detected, wherein the first end of the elastic sheet and the second end of the elastic sheet are two opposite ends of the elastic sheet; and
the elastic sheet is configured to change a resistance value of the resistance strain gage according to a deformation of the elastic sheet caused by vibration of the liquid to be detected;

wherein a first end of the detection circuit is electrically connected to the resistance strain gage, a second end of the detection circuit is connected to the main control board;

the detection circuit is configured to determine an output voltage according to the resistance value of the resistance strain gage, wherein the main control board determines a depth of the liquid to be detected according to the output voltage;

wherein the steps of the liquid level depth detection method comprises:

controlling the drive component to drive a vibration of the paddle at a preset rate to vibrate the liquid to be detected;

determining the output voltage of the detection circuit in response to detecting a vibration of the elastic sheet; and determining the depth of the liquid to be detected according to the output voltage.

10. The readable storage medium according to claim 9, wherein the step of determining the output voltage of the detection circuit in response to detecting the vibration of the elastic sheet comprises:

determining the resistance value of the resistance strain gage attached to the elastic sheet according to the deformation of the elastic sheet when the vibration of the elastic sheet is detected, wherein the resistance strain gage comprises a positive strain resistor and a negative strain resistor; and determining the output voltage of the detection circuit according to the resistance value.

* * * * *